Nov. 3, 1953 M. M. FRANCON 2,657,614
PHASE CONTRAST OBSERVATION
Filed June 19, 1950
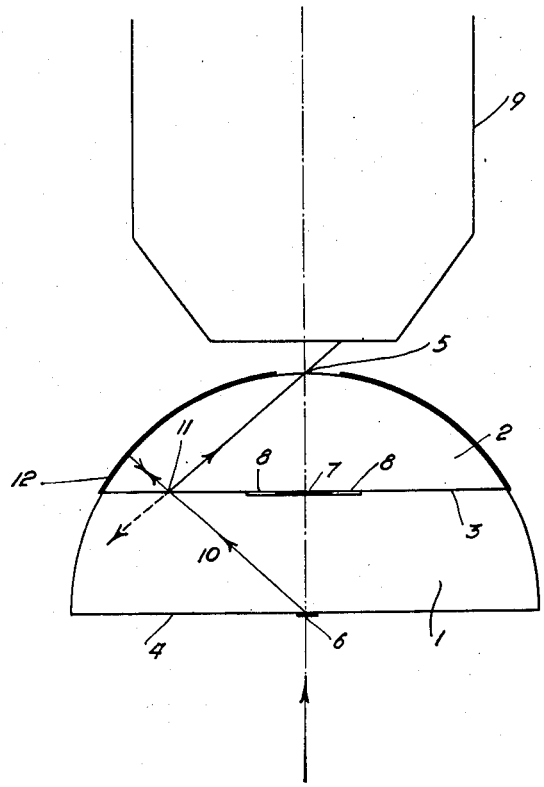

Patented Nov. 3, 1953

2,657,614

UNITED STATES PATENT OFFICE 2,657,614

PHASE CONTRAST OBSERVATION

Maurice M. Françon, Paris, France, assignor to Centre National de la Recherche Scientifique, Paris, France, a corporation of France Application June 19, 1950, Serial No. 168,882

4 Claims. (Cl. 88—39)

1

It is well known that the method of observation by means of phase contrast enables an investigation of small and absolutely transparent objects, which would be invisible by conventional observation methods.

The principle according to said method is the following.

If a plane wave produced by a pin-hole light source located at an infinite distance, for example by means of a collimating device is propagated through a transparent medium presenting small variations in thickness or refractive index, said variations cause local changes in the phase of the light output and become visible through an instrument if, by means of a suitable device, said phase variations are converted into luminous intensity variations.

The above-mentioned result may be obtained by means of many known devices. In cases of microscopic observation such devices comprise a so-called "phase plate," which must be located on the image of the light source produced by the objective. Such a necessity generally implies serious disadvantages, among which the following are to be mentioned.

1. In nearly all present types of microscope objectives, the focus is located within the objective. Transformation of a conventional objective into a phase contrast objective thus necessitates disarranging and re-arranging the objective lenses, which operation is extremely delicate if all the properties of said objective are to be maintained.

2. The objective has been corrected so as to provide good quality images of an object located in the vicinity of its object focal plane, but not of objects located at infinity. Consequently the image of the source is generally poor, it bears numerous aberrations and the phase plate cannot screen its totality. Light rays diffracted by the transparent object are thus mixed with direct rays due to aberrations. Such effects are even increased by flaws in the condenser used as a collimator.

3. Finally, the direct wave, while being propagated through the objective, produces an important parasite light, due both to aberrations and parasite reflections.

One object of the present invention is to provide a device located externally of the microscope and giving an image in phase contrast which may be directly observed.

Another object of the present invention is to provide a device which enables immediate conversion of a conventional microscope into a phase

2 contrast microscope, without any disarrangement.

The invention will be described with reference to the appended drawing which shows an axial section of the device.

A transparent half-sphere, for example made of glass, is divided into two parts 1 and 2 by a plane 3 parallel to the base 4 and approximately located at an equal distance from the apex 5 and center 6 of said sphere. On the circle resulting from the section of the half-sphere by plane 3 a half-transparent, half-reflecting layer is deposited, such as a layer of titanium oxide and a plate made of an opaque central part or spot 7 surrounded by an annular phase plate 8 is set in the center. Parts 1 and 2 of the half-sphere are then cemented together, for example by means of Canada balsam, or of any similar substance, and the spherical top surface is made reflective for instance by means of an aluminium deposit, except for a small area surrounding the apex 5, and the dimensions of which are substantially the same as those of the opaque portion or spot 7 of the phase plate.

Phase plate 8 may be embedded in either of parts 1 or 2 of the half-sphere, suitably cut away for such purpose, or in Canada balsam, or any similar substance capable of cementing the half-sphere parts together.

The device then operates as follows.

The object to be investigated is placed in the vicinity of the center 6 of the half-sphere. It receives a light beam from a light source, an image of which is formed on the surface consisting of the central opaque zone 7 and the phase plate 8 by means of a condenser. Neither the said source nor the said condenser are shown in the drawing.

Directions of the light rays are as follows:

1. *Direct light.*—The portion of direct light falling onto the central opaque zone 7 of the phase plate is partially reflected downwards, but it does not pass through transparent zone 5, and, consequently, it cannot penetrate into the objective 9 of the microscope. A direct light ray having passed through the annular phase plate 8 is reflected by the curved reflecting surface, and is again partially reflected on the semi-reflecting surface and emerges at 5' to enter the microscope objective.

2. *Diffracted light.*—In considering now a light ray 10 diffracted by the transparent object located at 6, it may be seen that part of such ray is propagated, without deviation, through the semi-reflecting layer, reaching at 12 the reflecting portion of the sphere, is reflected back thereby, is then partially reflected by the semi-reflecting layer, emerges from the half-sphere at 5, and then enters objective 9. Part of the ray is reflected as indicated by the broken line arrow, and is effectively lost.

All light rays from a determined point of the object situated near center 6 thus exactly pass through one same point near apex 5.

The device thus performs a strictly anastigmatic and aplanitic transmission of the image of an object and enables to set the phase plate in position in front of the optical observation system. The image resulting from said transmission is a directly observable phase contrasted image.

Particularly such an image may be observed through a lens or a conventional microscope without any previous transformation. Shifting from normal observation to phase contrast observation is thus an easy operation.

It is only necessary to insert the above-described device between the condenser and the objective of the microscope, the specimen being placed at 6.

This device may be adapted as well to dry objectives as to immersion objectives and makes it possible to use numerical openings up to 1.35.

What I claim is:

1. An optical phase contrast observation device comprising a first portion of a sphere of transparent material limited by two parallel planes one of which is a diametral plane of said sphere, the other plane being at a distance from the first plane substantially equal to one half of the radius of said sphere, a second portion of a sphere of transparent material similar to that of said first portion, completing said first portion to form a hemisphere, said two sphere portions being assembled to form a hemisphere with a base and a separating surface parallel to said base, a layer of half-transparent, half-reflecting material being inserted between the two sphere portions over the whole of said separating surface, a plane, circular phase plate adapted to produce a difference of phase between light rays passing through it and light rays passing outside said plate, said plate having a central circular opaque spot disposed centrally of said separating surface, the external surface of said second sphere portion being covered by a layer of reflecting material, except for a spot at the apex of the hemisphere, said last named spot having substantially the same measurements as said opaque spot.

2. An optical phase contrast observation device comprising a first portion of a sphere of transparent material limited by two parallel planes one of which is a diametral plane of said sphere, the other plane being at a distance from the first plane substantially equal to one half of the radius of said sphere, a second portion of a sphere of transparent material similar to that of the first portion, completing said first portion to form a hemisphere, said hemisphere having a base and a separating surface parallel to said base, the surface of one of said portions corresponding to said separating surface being covered by a layer of a half-transparent, half-reflecting material, a circular recess being provided in the central part of the surface of one of said portions corresponding to said separating surface, a plane, circular phase plate adapted to produce a difference of phase between rays of light passing through it and rays of light passing outside it, said phase plate having an opaque central circular spot and said plate being arranged in said recess, parallel to said separating surface, the external surface of said second sphere portion being covered by a layer of reflecting material, except for a spot at the apex of the hemisphere, said last named spot having substantially the same measurements as said opaque spot.

3. An optical phase contrast observation device comprising a first portion of a sphere of transparent material limited by two parallel planes one of which is a diametral plane of said sphere, the other plane being at a distance from the first plane substantially equal to one half of the radius of said sphere, a second portion of a sphere of transparent material similar to that of said first portion, completing said first portion to form a hemisphere, said two sphere portions being cemented together by means of a substance providing substantially the same refractive index as the two sphere portions, to form a hemisphere having a base and a separating surface parallel to said base, the surface of one of said portions corresponding to separating surface being covered by a layer of a half-transparent, half-reflecting material, a plane, circular phase plate having an opaque central circular spot being embedded at the central part of said separating surface, within the material by means of which the two sphere portions are united, and the external surface of said second sphere portion being covered by a layer of reflecting material, except for a spot at the apex of the hemisphere, said last named spot having substantially the same measurements as said opaque spot.

4. An optical phase contrast observation device comprising a first portion of a sphere of transparent material limited by two parallel planes one of which is a diametral plane of said sphere, the other plane being at a distance from the first plane substantially equal to half the radius of said sphere, a second sphere portion of transparent material similar to that of first portion, completing said first portion to form a hemisphere, said two sphere portions being assembled to form a hemisphere with a base and a separating surface parallel to said base, a layer of half-transparent, half-reflecting material between the two sphere portions over the whole of said separating surface, an opaque, circular spot disposed centrally on said separating surface, and a plane, annular phase plate disposed immediately around said central spot on said separating surface, the external surface of said second sphere portion being covered by a layer of reflecting material, except for a spot at the apex of the hemisphere, said last named spot having substantially the same measurements as said opaque spot.

MAURICE M. FRANÇON.

References Cited in the file of this patent

UNITED STATES PATENTS

| Number | Name | Date |
|---|---|---|
| 2,378,301 | Kaprelian | June 12, 1945 |

OTHER REFERENCES

Françon, "Noveau dispositif à contraste de phase pour microscope," article in Comptes Rendues Academie des Sciences, vol. 229, pages 183, 184 and 185. Published by Gauthier-Villars, Paris, 1949.

Grey, "A New Series of Microscope Objectives," article in the Journal of the Optical Society of America, volume 40, No. 5, May 1950, pages 283 through 290. Published by American Institute of Physics, New York, New York.